United States Patent [19]

Hartigan et al.

[11] Patent Number: 5,709,896
[45] Date of Patent: Jan. 20, 1998

[54] REDUCED-FAT FOOD DISPERSIONS AND METHOD OF PREPARING

[75] Inventors: Susan Erin Hartigan, Franklin Park; Mark T. Izzo, Flemington; Carol A. Stahl, Princeton; Marlene T. Tuazon, Iselin, all of N.J.

[73] Assignee: FMC Corporation, Philadelphia, Pa.

[21] Appl. No.: 665,625

[22] Filed: Jun. 18, 1996

Related U.S. Application Data

[60] Provisional application Nos. 60/001,050 Jun. 23, 1995 and 60/007,192 Nov. 1, 1995.

[51] Int. Cl.$^6$ .................. A23G 1/00; A23G 3/00
[52] U.S. Cl. .................. 426/103; 426/573; 426/574; 426/602; 426/658; 426/659; 426/660; 426/804
[58] Field of Search .................. 426/89, 103, 573, 426/574, 575, 576, 577, 658, 659, 660, 804, 601, 602

[56] References Cited

U.S. PATENT DOCUMENTS

| | | |
|---|---|---|
| 5,185,175 | 2/1993 | Loh et al. . |
| 5,190,786 | 3/1993 | Anderson et al. . |
| 5,192,569 | 3/1993 | McGinley et al. . |
| 5,258,199 | 11/1993 | Moore et al. . |
| 5,462,761 | 10/1995 | McGinley et al. ............ 426/574 |

FOREIGN PATENT DOCUMENTS

| | | |
|---|---|---|
| 9501729 | 1/1995 | WIPO . |
| 9526643 | 10/1995 | WIPO . |

*Primary Examiner*—Leslie Wong
*Attorney, Agent, or Firm*—Polly E. Ramstad

[57] ABSTRACT

Reduced-fat food dispersions containing an aqueous dispersion of sugar and an aggregate of microcrystalline cellulose and a gum selected from galactomannan gum, glucomannan gum and mixtures thereof exhibit the ability to set, have sugar bloom stability and mimic the rheology of full fat chocolate coatings. These dispersions are useful, for example, in food coatings, food inclusions and fudge. A method for setting of a high sugar content dispersion to a solid which solid is a soft or a firm solid at room temperature is also provided.

35 Claims, No Drawings

REDUCED-FAT FOOD DISPERSIONS AND METHOD OF PREPARING

This application claims the benefit of the filing of provisional applications for Reduced Fat Food Dispersions Ser. No. 60/001,050 filed Jun. 23, 1995 and Ser. No. 60/007,192 filed Nov. 1, 1995.

TECHNICAL FIELD

This invention relates to aqueous sugar dispersions containing dispersed aggregates of microcrystalline cellulose ("MCC") and a galactomannan or glucomannan gum and their use as food products including coatings for food products. These aqueous sugar dispersions are particularly useful as reduced fat replacements for traditional coatings which are dispersions of solids, for example, chocolate, in a continuous phase of fat or for chocolate chip morsels.

BACKGROUND ART

Traditional chocolate and compound coatings for food are dispersions of solids, for example, sugar, milk, cocoa particles and fat, in a continuous phase of fat. The fat melts when warmed, allowing the coating to flow and be applied to a variety of products. When the coating cools, the fat crystallizes, causing the coating to become solid. The coated product can then be packaged, and it can be held in the consumer's hand. When eaten the fat again melts in the mouth, giving the product desirable organoleptic qualities. There has not been much success at reducing the fat content of these coatings to less than about 23 weight percent by weight of coating. At these lower fat levels viscosities of these coatings are significantly increased making processing difficult. In addition a notable decrease in creaminess in the mouth is encountered.

The present invention replaces that traditional fat system with an aqueous dispersion of solids, primarily sugars, in a continuous aqueous phase of sugar syrup containing dispersed aggregates of microcrystalline cellulose and a gum which is a galactomannan gum, glucomannan gum or mixture thereof. The dispersion can contain less than 25 percent by weight fat to no fat with the abilities to flow at elevated temperatures, undergo a temperature mediated set and to be solid at room temperature.

This invention is based on the discovery that MCC-GUM allows for the preparation of aqueous based reduced fat food including coatings which set and can do so in less than an hour, which have sugar bloom stability and which mimic the rheology, namely, plastic viscosity and yield point of full fat chocolate coatings. Additionally, these aqueous based dispersions have good cling, provide good mouth feel including a smooth texture and creamy feel, good flavor, melt in the mouth, and are a firm or soft solid at room temperature.

DISCLOSURE OF THE INVENTION

The aqueous dispersions of this invention comprise a sugar syrup and a water-dispersible, water-stable MCC-GUM. They also preferentially contain additional ingredients such as water, fats, glycerin, and flavoring agents. Although the composition of the dispersions will vary depending upon their use and desired characteristics, they will generally comprise from about 50 to about 90 weight percent of sugar, from about 0.2 to about 6 weight percent of MCC-GUM, from about 2 to about 20 weight percent of water, from about 0 to about 20 weight percent of fat, from about 0 to about 25 weight percent of glycerin and from about 0 to about 30 weight percent of a flavoring agent, based on the weight of the dispersion. Preferably the dispersions comprise from about 60 to about 80 weight percent of sugar, from about 0.5 to about 3.0 weight percent of MCC-GUM, from about 6 to about 16 weight percent of water, from about 0 to about 6 weight percent of fat, from about 5 to about 15 weight percent of glycerin and from about 0 to about 10 weight percent of a flavoring agent, based on the weight of the dispersion.

The term "MCC-GUM" refers to the aggregates of microcrystalline cellulose and galactomannan gum, glucomannan gum and mixtures thereof useful in this invention. Descriptions of such MCC-GUM where the gum is galactomannan are found in U.S. Pat. No. 5,192,569 and descriptions where the gum is glucomannan are found in PCT application U.S. Ser. No. 95/04147 filed Apr. 3, 1995 both of which are incorporated herein by reference. The term "MCC" as used to describe this invention refers to microcrystalline cellulose. The term sugar syrup as used to describe this invention refers to the combined total of sugar and water in the dispersion. The term coprocessed when used to describe the microcrystalline cellulose and the gum refers to the MCC and GUM being aggregated.

The MCC-GUM used in this invention should be such that the microcrystalline cellulose comprises the predominate amount of the aggregate. The MCC-GUM comprises about 60–99 and preferably about 70–95 weight percent of microcrystalline cellulose and from about 40–1, and preferably about 30–5 weight percent of galactomannan gum, glucomannan gum or mixtures thereof. It is further preferred that the MCC-GUM have an elevated gum content where the weight ratio of the MCC still predominates over the gum but wherein the amount by weight of the gum is about 15–40 percent and preferably about 15–30 percent with the MCC comprising the remainder, that is, about 60–85 and preferably about 70–85 weight percent. The galactomannan gum is preferably guar gum, locust bean gum or mixtures thereof. Guar gum is the most preferred. The glucomannan gum is derived from konjac and certain species of evergreen. Konjac derived glucomannan is preferred and it may be native (crude) konjac flour, clarified konjac glucomannan, cold-melt konjac or preferably purified konjac glucomannan.

A third component, an edible material, may optionally be incorporated in the MCC-GUM composition to impart additional properties thereto. This component desirably is a lipophilic or hydrophilic material, wherein the latter material may include proteinaceous substances or polysaccharides, or combinations thereof. Among the lipophilic materials which may be employed are vegetable and animal fats, natural butterfat, and partially hydrogenated and hydrogenated products thereof. Examples of polysaccharides, which may be of natural or synthetic origin, are maltodextrin, corn syrup, carrageenan, sodium carboxymethylcellulose, xanthan gum, gum tragacanth, sodium alginate, high and low methoxyl pectins, gum agar, gum karaya, gum arabic, or any mixtures thereof. Monosaccharides such as dextrose and fructose also may be used for this purpose. These materials may be added for the purpose of modifying the surface characteristics of the MCC-GUM aggregate by creating the flavor and taste sensation of fat. The third component is preferably added to the MCC-GUM aggregate before it is dried, thereby forming an adsorption layer thereon. Such materials and their addition to the MCC-GUM are the same as those described in U.S. Pat. No. 5,192,569 for MCC and galactomannan gum (and also the same as those described in PCT application U.S. Ser. No. 95/04147 filed Apr. 3, 1995 for MCC and glucomannan gum).

MCC-GUM can be further characterized by describing its behavior when mixed with water, or mixed with water and a glycerin which is a preferred step in production of the dispersions. MCC-GUM is most functional in this invention when it is blended with water under high shear conditions. Under these conditions clusters of MCC-GUM particles separate into individual spherical particles of MCC-GUM. These spherical particles are further broken down into fibrous aggregates of MCC-GUM. A blend of spherical and fibrous particles is preferred in this invention. A blend of about 40–60 percent spherical particles and about 60–40 percent fibrous particles is particularly suitable for the invention. A dispersion of all spherical MCC-GUM particles produce dispersions which set slower, while dispersions containing all fibrous MCC-GUM particles produce dispersions with higher viscosities and which set faster.

MCC-GUM of a certain initial viscosity range is preferred in producing the dispersions of this invention. When MCC-GUM is mixed with water or water and glycerin at 12.3 weight percent (the ratio needed to produce a final dispersion with 2 weight percent MCC-GUM) the resulting initial viscosities of the MCC-GUM/water mixture will range between about 120,000 and 180,000 centipoises (cps) and more preferably between about 140,000 and 170,000 cps. Viscosity is measured with a Brookfield Viscometer model RVT equipped with a helipath and T-spindle number C with a rotational speed of 2.5 rpm.

The MCC-GUM affects the set characteristics, the bloom (sugar) stability, viscosity or rheology characteristics of the dispersion, final firmness of the dispersion, creaminess and flavor of the dispersion. Generally, the greater the amount of MCC-GUM, the greater the viscosity, the quicker the set and the greater the bloom stability is. The amount of MCC-GUM used in the dispersion will generally range from about 0.2–6 weight percent, and preferably about 0.5–2.5 weight percent.

It is believed that the MCC-GUM provides a unique function to the dispersions of this invention by affecting sugar crystallization and set of the dispersion. It is theorized the MCC-GUM creates many nucleation sites in the supersaturated solution, and the MCC-GUM produces a viscosity to the dispersion which mediates sugar crystal propagation so as to allow set but prevent sugar bloom, namely, by not allowing the crystals to grow too large. It is hypothesized that the contribution of the strong bonding (thought to be hydrogen bonding) between MCC and the galactomannan or glucomannan gum present is also a contributing factor to the set. This is evidenced by the fact that coprocessed MCC-alginate and MCC-CMC (carboxymethyl cellulose) do not provide set to these dispersions.

Sugars used in this invention include liquid and solid sugars, and includes: sucrose, glucose, fructose, dextrose, lactose, oligofructose, maltodextrins such as ones having a dextrose equivalent (DE) of 10 and 15, starches, inulin, polydextrose, invert syrups, corn syrups including high maltose corn syrup, having a DE of about 20–65 and preferably 23, 36, 42 and 63, crystallizable sugar alcohols including isomalt, sorbitol, lactitol, mannitol, maltitol, xylitol, and hydrogenated starch hydrolysate, and mixtures thereof. Preferred sugars are sucrose, fructose, mannitol, isomalt, lactose, dextrose, and corn syrups having a DE of about 20–65. Sucrose, fructose, mannitol, isomalt, lactose, and dextrose are more preferred, and sucrose, fructose, lactose, and isomalt are most preferred.

The amount of sugar in the dispersion will generally range from 50–90 percent and preferably from about 60–80 percent by weight.

It is preferred that sucrose comprise at least a portion of the sugar. Preferably sucrose will comprise about 50–100, more preferably about 70–100 and most preferable about 80–95 weight percent of the total weight of sugars in the dispersion. When the dispersion is being used to coat a food having a low water activity of about 0.1–0.3, then the sucrose will comprise about 65–75 weight percent of the total sugars present in the dispersion. The sucrose will comprise about 75–80 weight percent of the total sugars when the dispersion is used to coat a food having an intermediate water activity of about 0.4–0.65. The sucrose will comprise about 90–100 weight percent of the total sugars present when the dispersion is used to coat a food having a high water activity of about 0.65–0.8.

It is preferred that a mixture of sugars be used, e.g., sucrose and at least one other sugar to minimize or prevent sugar bloom or at least one other sugar such as lactose, mannitol, isomalt or other low solubility sugar to help speed the set of the dispersion. By "low solubility sugar" is meant a sugar having a water solubility at 20° C. of less than about 25 percent.

When coatings having a lower caloric content are desired, then it may be necessary to replace a portion of the sucrose and other nutritive sugar(s) with a lower calorie sugar having less than 4 calories per gram. Lower calorie sugars useful for this purpose include sugar alcohols, non-nutritious sugars, i.e., isomalt, oligofructose, polydextrose, mannitol, maltitol, lactitol, xylitol, hydrogenated starch hydrolysate or mixtures thereof. In the lower calorie dispersions, one of the sugars must be a low solubility sugar to achieve a set within about an hour. Examples are mannitol and isomalt.

A low solubility sugar will be used in an amount of at least about 8 weight percent and preferably at least amount 15 weight percent. Preferably, the low solubility sugar will not exceed about 50 weight percent of the dispersion. Generally, the less soluble the sugar is, the less of the sugar that will be needed; and the higher the degree of water solubility of the other sugars, the more of the low solubility sugar which will be needed. Similarly, the less water contained in the dispersion, the less of the low solubility sugar which will be needed. Using isomalt as an example, at least about 17 weight percent of the lower calorie dispersion will be isomalt when the water content of the dispersion is about 7 weight percent and at least about 35 weight percent of isomalt will be used when the water content of the dispersion is about 11 weight percent. At least about 20 weight percent of the lower calorie dispersion will be mannitol when the water content of the dispersion is about 11 weight percent, and at least about 8 weight percent of the dispersion will be lactose when the dispersion contains about 8 percent by weight water. In the lower calorie coatings, it is preferred that they contain from about 30–35 weight percent sucrose.

The sugars affect the set, viscosity, sugar bloom stability of the dispersion, and texture, feel and appearance of the dispersion. The other sugars, except lactose, in combination with sucrose generally reduce the viscosity of the dispersion, and help keep the sugar portion of the dispersion in solution better, thereby decreasing the potential for sugar bloom. For example, replacing a portion of the sucrose with isomalt not only reduces the caloric content of the dispersion, but can produce a coating exhibiting more sheen and snap than an all sucrose formula, has a lower water activity ($A_w$ of approximately 0.57 versus 0.67) and can set in about 5 to 15 minutes. Lactose and mannitol when used to replace a portion of the sucrose can provide a more fudge-like coating with less snap than isomalt or less sheen which sets within about 15 minutes.

The amount of water the dispersion contains will be a function of the desired water activity of the product, the desired viscosity and the amount of MCC-GUM. The amount of water needs to be sufficient to hydrate the MCC-GUM. Generally, it will range from about 2–20 weight percent and preferably about 6–16 percent by weight. The water may be added by itself or as part of the carbohydrate syrups of the dispersion. At the upper limits of the water, it may be necessary to add a preservative to prevent microbial growth if needed for the shelf life of the product, and it may be necessary to heat treat, for example, pasteurize, the dispersion.

The fats used will depend upon the desired flavor profile (fats essentially add or enhance flavor), nutritional qualities and texture of the finished dispersion. Generally, the more fat contained in the dispersion, the softer it will be after it has set. The amount of fat in the dispersion generally will be about 0–20 weight percent, preferably 0–15 weight percent and more preferably about 0–6 weight percent of the weight of the dispersion. Fats useful in this invention include cocoa butter as chocolate liquor, cocoa powder, and straight cocoa butter, milk fat, nonlauric fats, such as cocoa butter, palm oil, soy bean oil, canola and cottonseed oil, lauric fats, such as those derived from coconut and palm kernels, corn oil, olive oil, peanut oil and hydrogenated fats, examples of which are hydrogenated soy bean oil, palm oil, canola oil, and cottonseed oil. Preferred fats are chocolate liquor and low fat cocoa powder.

The amount of glycerin (glycerol) component used in the dispersion will depend on the speed of set desired for the dispersion, the water activity of the food product to which the dispersion will be applied and the desired viscosity of the dispersion. Glycerin is used to decrease viscosity of the dispersion without the addition of water and to control the water activity of the dispersion. It is preferred that glycerin be added to the dispersion when it is to be used on a food product having a low water activity. Additionally, the more glycerin added generally the softer the set of the dispersion. The amount of glycerin in the dispersion will generally be from about 0–25, preferably from about 5–15 and more preferably from about 9–13 weight percent of the total weight of the dispersion. Preferably the glycerin will not exceed more than about 12 percent, since at these levels it can cause a burning sensation or bitterness flavor. Consequently, at amounts of about 12 weight percent and above, it may be necessary to use flavor masking agents to ameliorate the burning or bitterness sensation. The sugar alcohols, e.g., sorbitol, lactitol, maltitol, xylitol, hydrogenated starch hydrolysate and mixtures thereof, of the sugar portion of the dispersion are also polyols which affect set and water activity.

Other flavoring materials, besides those imparted by the fats, can also be used. They will generally be used in an amount of from about 0–30 weight percent and preferably from about 0–10 weight percent of the total weight of the dispersion. Examples include yogurt powder, peanut powder, fruit powder, milk powder, carob powder and flavor extracts such as vanilla, butterscotch and mint. If the flavoring desired contains fat, it is generally preferable to use a low fat version and to keep the amount of fat low, if that is a desired characteristic of the dispersion.

Emulsifiers are often used in traditional fat-based chocolate and compound coatings. Although not needed, they can be added to the dispersions of this invention, for example, to lower viscosity or to affect texture. Emulsifiers are desired when the dispersion contains fat or has a low water activity.

A variety of coatings can be obtained by altering the ratio of ingredients, selection of ingredients and parameters of preparation. Such can be readily done by one skilled in the an depending upon the desired use and characteristics of the dispersion.

These dispersions are useful as food products such as coatings, layers, inclusions such as chocolate chips, peanut butter chips, yogurt chips, butterscotch chips and icings, variegates such as fudge or peanut butter in ice cream, fillings such as creme fillings for cookies or co-extruded devils food cake cookies, centers and fudge. Examples of food products which these dispersions can coat include bakery products such as cookies including soft cookies, low moisture biscuits, crackers, cakes, donuts, snack items such as rice cakes, pretzels and granola bars, and confectionery centers such as nougats, caramels, toffees and marshmallows, and ice cream. Inclusions are pieces of food material which may be included within another food product, for example, cookies, cakes and granola bars. Examples of pieces are chunks, chips, morsels, bits, layers, and swirls of various flavors such as peanut butter, chocolate, yogurt, butterscotch, vanilla and various fruit flavors.

The food products on which the dispersions are used can have low, intermediate or high moisture contents. By low moisture content is meant food products having a moisture content of up to about 6 weight percent and preferably less than about 4, weight percent or a water activity, $A_w$, of up to about 0.3 and preferably about 0.1–0.2. Examples of low moisture foods include biscuits, cookies (rotary, molded and wire cut), crisp granola bars, pretzels and rice cakes. By intermediate moisture content is meant food products having a moisture content of about 5–16 weight percent and preferably about 8–12 weight percent or a water activity, $A_w$, of about 0.3–0.7 and preferably about 0.55–0.65. Soft cookies and cakes, for example, devil's food cake, and confectionery centers are examples of intermediate moisture foods. By high moisture content is meant food products having a moisture content of about 12–20 weight percent and preferably about 16–20 weight percent or a water activity, $A_w$, of about 0.7–0.9 and preferably about 0.7–0.8. At $A_w$ of greater than about 0.7, one needs to consider the effect of yeasts and molds ($A_w$ of about 0.7–0.8) and bacteria ($A_w$ greater than about 0.8). Consequently, at these higher levels of moisture, preservatives will generally be needed and the dispersion may also be subjected to a heat treatment. Examples of high moisture foods include snack cakes, donuts, and cakes. Additionally, when used on high moisture foods, the dispersions after their initial set may soften and become like icing in consistency. To prevent water migration between the product and the coating, it is desirable to formulate the coating to have an $A_w$ as close as possible to the product it will be coating while still maintaining the ability to process the dispersion, for example, transporting to and using in enrobing equipment.

A preferred method for production of a dispersion activates the MCC-GUM in water. A high shear mixer, having the capability of 10,000 revolutions per minute (rpm), such as the type produced by Silverson machinery, Admix Inc. or Arde Barinco Inc. or Breddo, or a homogenizer can be used to activate the MCC-GUM in water. A shear time of about 7 minutes on a Silverson mixer will produce activated MCC-GUM in the spherical-fibrous state having an initial viscosity of about 120,000–180,000 cps at 110° F. (Brookfield RVT viscometer, helipath, T-spindle C, 2.5 rpm measured after one minute.) This mixture approximates the texture of sour cream or mayonnaise.

The MCC-GUM water blend is added to the glycerin in the formula with a propeller mixer, for example a Lightnin' mixer, having the capability of 1300 rpm. The MCC-GUM/ water blend is incorporated rapidly over 1 minute until a smooth mixture is obtained. Addition of the MCC-GUM blend to the glycerin too slowly, for example, over a 5 minute period can result in a precipitation of the MCC-GUM with subsequent loss of MCC-GUM functionality in the dispersion. After obtaining a smooth MCC-GUM/water/ glycerin blend, any other liquids in the formula, except for sugar, is added, still using a low shear (propeller mixer) at about 1300 rpm.

At this point, fructose, or any other non-sucrose sugars are added slowly while continuing to mix with the low shear (propeller mixer) at about 1300 rpm. Mixing is continued for about 5 minutes to ensure dissolution of the sugar.

At this point the mixing speed is turned down to about 800 rpm and the rest of the solids are added, for example, sucrose, fat and flavoring materials. These solids represent the bulk of the formula and are added rapidly over 2 minutes. During this step the dispersion becomes very thick and dough like, and then becomes thin and flowable as the sugars dissolve as the temperature of the dispersion increases. The higher the temperature, the more sugars will be dissolved and the lower the viscosity will be.

Preferably, the MCC-GUM is dispersed in water and the glycerin, under high shear until an initial viscosity of about 120,000 to 140,000 cps is achieved (Brookfield model RVT viscometer, helipath, spindle C, 2.5 rpm, dial reading 30–45). It is preferred that heat not be applied during this dispersion phase, although the dispersion process can be accelerated by starting with a warm, about 130° F., mixture of water and glycerin. Any dry ingredients except cocoa are blended together and about half of the sugars and the other dry ingredients are added and mixed into the dispersion. The mixture is heated to the desired temperature, for example, 140° F., and held at that temperature for a sufficient time to solubilize the sugars and achieve minimum viscosity. Any additional glycerin needed for the formulation may be added. The remaining dry ingredients except cocoa are mixed in while maintaining the temperature. Finally, the flavoring agent is mixed until incorporated into the mixture. This technique of mixing provides for faster dispersion of the MCC-GUM and a more robust coating, for example, one having a decreased potential for the MCC-GUM to flocculate.

The temperature of the dispersion needs to be sufficient to cause enough or preferably total dissolution of the sugar to obtain a product with low enough viscosity to process and deliver the desired setting rate. The dispersion will preferably be produced at about 120°–200° F. and preferably from about 140°–200° F. However, one of the advantages of these dispersions is they can be prepared at temperatures of about 140°–180° F. and preferably about 140°–150° F. which are often required in current commercial enrobing, dipping and coating processes and still exhibit the ability to set. Consequently, in some commercial settings the preferred temperature of the dispersion is 140°–150° F. and preferably 140° F. At 140° F. the solubility of the sugar, e.g., sucrose, is sufficient (about 77 percent) to allow for a flowable dispersion which can be used to coat products. The difference between 140° F. and room temperature is large enough to allow for significant recrystallization of sugar to give a strong MCC-GUM/sugar matrix to enable quick set.

After production of the dispersion, it is preferably applied to the food product ("base") (enrobed, extruded or dipped) at the same temperature as it was produced. Since it is believed that it is the recrystallization of sugar into a matrix with MCC-CUM which provides set, this recrystallization is preferably accomplished under static conditions. On the other hand, the coating may be produced at one temperature and applied to the base at another lower temperature with some loss at setting speed and firmness. After its application or extrusion, the dispersion is allowed to set. It is preferred that it set within about an hour and more preferably about 10–30 minutes and most preferably about 5–15 minutes. Setting time is affected, among other things, by the amount of MCC-GUM and its physical state (spherical or fibrous), by the thickness of the coating on the base food, the temperature difference between processing temperature of the dispersion and the temperature at which the set occurs, the shape and size of the food being coated, the amount of non-crystalline sugars which comprise the dispersion and the viscosity of the dispersion prior to its application. The setting of the dispersion is effected by a temperature differential between the dispersion at time of application and the temperature at which the set is allowed to occur. Generally, the greater this temperature differential, the shorter the time period for set. For most applications a temperature differential of about 60° F. is preferred and a differential of about 80° F. is more preferred. Consequently, room temperature can be used. Where a faster setting than can occur at room temperature is desired, the dispersion can be cooled, for example, the use of a cooling tunnel, at temperatures from about −15° to about 15° C. and preferably from about 5° to about 15° C.

EXAMPLE 1

A fat-free, chocolate-flavored, aqueous dispersion

A dispersion of 100 grams of aggregated MCC-GUM formed by aggregating 85 percent by weight MCC and 15 percent by weight guar gum (referred to as MCC-guar-15 in the examples) in 710 grams of water at room temperature was prepared using a high shear Silverson mixer. The sample was sheared 7 minutes at 10,000 RPM to produce an initial viscosity of 140,000 cps (Brookfield RVT, helipath, Spindle C, 2.5 rpm. In a stainless steel beaker was placed 85 grams of glycerin, and 81 grams of water and the beaker was placed in a water bath heated at 60° C. (140° F.). To this beaker was then added 81 grams of the dispersion while stirring the mixture with a Lightnin' mixer until it was smooth and free of lumps. To this smooth mixture a dry blend composed of 704 grams of sucrose, 25 grams of crystalline fructose, and 4 grams of sodium chloride was added quickly during a 2 minute period with continued mixing. The resulting mixture was covered to prevent loss of water and heated for 30 minutes to solubilize the sucrose. At the conclusion of this period, 30 grams of cocoa containing 10% fat was added to the mixture which was then mixed for 10 minutes before dipping devils food cookies and oatmeal cookies (both intermediate moisture cookies) in it to coat them. The coating set up within 15 minutes, providing a relatively thin, even coating on the cookies. The cookies were packaged in polypropylene-polyethylene bags. No bloom occurred with this coating during the three months that the cookies were stored at room temperature. This coating was considered to be acceptable because of the thin viscosity allowed easy enrobing. This coating, believed due to its level of MCC-GUAR, was softer than the coating of example 2.

EXAMPLE 2

A fat-free-chocolate-flavored, aqueous dispersion

A dispersion of 100 grams of MCC-guar-15 in 710 grams of water at room temperature was prepared using a high shear Silverson mixer as in Example 1. The method of Example 1 was used to combine 162 grams of this dispersion with 85 grams of glycerin. The dry mixture added to this dispersion was composed of 694 grams of sucrose, 25 grams of crystalline fructose, 50 grams of dextrose, and 4 grams of sodium chloride. The remainder of the procedure was identical with Example 1. This coating had a somewhat higher viscosity than that of the coating of Example 1. Also, its greater cling resulted in a thicker coating. The set time was 6 minutes at ambient temperature, and the resulting coating was firmer believed due to the higher level of MCC-guar. Devils food cookies (intermediate moisture level) were enrobed with this coating. Evaluation of these coated cookies after three months showed that no bloom had occurred, and the coating was completely acceptable. This formulation may be used to enrobe intermediate, moisture confectionery centers such as nougats, caramels and marshmallows, as well as intermediate moisture cookies. It had a good firm texture, clean flavor release, and desirable melting characteristics in the mouth.

EXAMPLE 3

A chocolate-flavored, fat-free aqueous dispersion having icing-like properties

A dispersion of 100 grams of MCC-guar 15 in 500 grams of water at room temperature was prepared using a high shear Silverson mixer. Dispersion required 30 minutes to develop a weak gel which could be cut with a spatula. The approximate viscosity of this dispersion was 280,000 cps by the Brookfield method used in Example 1. The method of Example 1 was used to combine 120 grams of this dispersion with 85 grams of glycerin. The dry mixture added to this dispersion was composed of 736 grams of sucrose, 25 grams of crystalline fructose, and 4 grams of sodium chloride. The remainder of the procedure was identical with Example 1. This formulation was very thick, resembling an icing which could be extruded rather than being poured during the enrobing process. The product was spread on top of an oatmeal cookie and brownie. The icing was thick enough that it held the shape imparted to it by the knife. In 5 minutes it was not sticky to the touch but upon pressing it was soft like an icing. Organoleptically, the product was smooth and creamy with a clean chocolate flavor release.

EXAMPLE 4

A chocolate-flavored, 4.5 percent fat aqueous dispersion coating

A dispersion of 100 grams of MCC-guar 15 in 630 grams of water at room temperature was prepared using a high shear Silverson mixer. The dispersion required about 15 minutes to achieve a sour cream-like consistency, with a viscosity of 160,000 cps by the standard Brookfield test of Example 1. In a stainless steel beaker heated in a hot water bath at 54.4° C. (130° F.) was placed 80 grams of glycerin, 105 grams of dextrose, and 60 grams of liquid fructose (23% by weight water). To this mixture which was stirred by a Lightnin' mixer fitted with a large blade was added 146 grams of the dispersion. The resulting mixture was stirred until it was smooth and free of lumps. A dry blend of 515 grams of sucrose and 4 grams of salt was rapidly added to the mixture, and the resulting mixture was covered and heated at 54.4° C. (130° F.) for 30 minutes to solubilize the sucrose. Finally, 90 grams of molten chocolate liquor was added to the mixture with 10 additional minutes of mixing at 54.4° C. (130° F.). Rotary molded, creme filled, chocolate cookies were enrobed with this low viscosity formulation.

Also, pretzels (low moisture content) were dipped in the formulation and placed on waxed paper for the coating to set. If the pretzels were kept at room temperature after being dipped, the coating required 45 minutes to set. However, if they were placed in a refrigerator, setting time was reduced to 15 minutes. The coated pretzels were placed in zippered polyethylene bags and stored at room temperature for four months without any bloom occurring. Due to the high fat content of these coatings the product exhibited an excellent chocolate flavor profile.

EXAMPLE 5

A fat-free, chocolate-flavored, aqueous dispersion

A dispersion of 84 grams of MCC-guar-15 in 592 grams of water at room temperature was prepared using a high shear Silverson mixer. After 15 minutes of high speed shearing, dispersion had the consistency of sour cream. In a stainless steel beaker was placed 100.95 grams of glycerin, and the beaker was placed in a water bath heated at 60° C. (140° F.). To the glycerin which was stirred with a Lightnin' mixer fitted with a large blade was added 33.8 grams of the dispersion, and mixing was continued until a smooth consistency was attained. A dry mixture composed of 167 grams of sucrose, 33 grams of crystalline fructose, 125 grams of Domino® non-sweet sugar (sucrose blended with lactisole sweetness reducer, sold by Amstar Corporation), and 1.75 grams of sodium chloride was added to the smooth mixture over a 5 minute period. This mixture was covered to prevent loss of water and heated at 60° C. (140° F.) for 30 minutes to solubilize the sucrose. At the conclusion of this period, 13.5 grams of defatted cocoa and 25 grams of chocolate flavor were added to the mixture. The resulting mixture was heated at 85° C. (185° F.) to decrease the viscosity of the coating to a point where it could be poured. Puffed cereal having an $A_w$ of 0.2 was coated with this material. To enable the coating to spread evenly over the cereal and to decrease the moisture content of the coating to minimize water migration into the cereal, the coated cereal was heated in an oven at 135° C. (275° F.) for 12 minutes. When stored at room temperature, the puffed cereal remained crisp. The $A_w$ of this coating was measured at 24° C. as being 0.337.

EXAMPLE 6

A chocolate-flavored, 4.5 percent fat food dispersion containing only sucrose

A dispersion of 100 grams of MCC-guar-15 in 674 grams of water at room temperature was prepared using a high shear Silverson mixer. After 20 minutes of high speed shearing, the dispersion had the consistency of sour cream and a viscosity of 180,000 cps by the standard Brookfield technique cited in Example 1. In a stainless steel beaker heated at 60° C. (140° F.) was placed 80 grams of glycerin which was stirred with a Lightnin' mixer fitted with a large blade. To the glycerin was added 154.8 grams of the dispersion. Mixing was continued until a smooth consistency was attained. A dry mixture composed of 671.2 grams of sucrose and 4 grams of sodium chloride was added to the smooth mixture over a 5 minute period. This mixture was covered to prevent loss of water and heated at 60° C. (140° F.) for 30 minutes to solubilize the sucrose. At the conclusion of this period, 90 grams of molten chocolate liquor was added to the mixture, and the resulting mixture was heated at 60° C. (140° F.) for 10 minutes. Snack cakes (high moisture content) were enrobed with this coating. The coating set up in about 5 minutes after which the coated cakes were able to be packaged. The coated cake could be easily picked up and resembled a brittle icing in the mouth. Using a Brookfield RVT viscometer equipped with spindle B and operated at 10 rpm, the viscosity was measured as being 1520 cps. After 9 months packaged in a polypropylene barrier, no bloom was evident, and the coating still had a rich dark chocolate appearance.

EXAMPLE 7

A chocolate-flavored, 5% fat, aqueous dispersion

A dispersion of 93.75 grams of MCC-guar-15 in 622.5 grams of water at room temperature was prepared using a high shear Silverson mixer. After 15 minutes of high speed shearing, the dispersion had the consistency of sour cream. In a stainless steel beaker heated in a 60° C. (140° F.) water bath and stirred by a Lightnin' mixer fitted with a large blade was placed 286.5 grams of this dispersion. To the dispersion was added a dry mixture composed of 1050 grams of 10X powdered sucrose and 6.0 grams of sodium chloride. Upon completing the 30 minute heating step to solubilize the sucrose, a mixture of 150 grams of molten chocolate liquor, 3.75 grams of vanilla flavor, and 3.75 grams of polysorbate 60, an emulsifier, were added to the coating formulation. This mixture was heated for 10 minutes before dipping doughnuts (high in moisture content) in it to enrobe them. The set time of this formulation was 10 minutes after which the coated doughnuts could be packaged. The $A_w$ of this formulation was 0.784 which requires that the formulation be pasteurized prior to the enrobing process to prolong shelf life and avoid the growth of yeast and mold. This formulation is also effective for enrobing other baked goods such as brownies, which, like doughnuts, have an $A_w$ of approximately 0.8. The coating was firm, could be handled and had an excellent chocolate flavor and mouthfeel.

EXAMPLE 8

A chocolate-flavored, 14.05 percent fat aqueous dispersion

A dispersion of 90 grams of MCC-guar-15 in 606.6 grams of water at room temperature was prepared using a high shear Silverson mixer. After 15 minutes of high speed shearing, the dispersion had the consistency of sour cream. In a stainless steel beaker stirred by a Lightnin' mixer fitted with a large blade was placed 72 grams of glycerin, and the beaker was heated in a water bath at 60° C. (140° F.). To this beaker was added 139.3 grams of the dispersion, and the resulting mixture was stirred until it had a smooth consistency. A dry mixture composed of 604.08 grams of 10X powdered sucrose and 3.6 grams of sodium chloride was rapidly added to the dispersion. The mixture was covered and heated for 30 minutes to solubilize the sucrose. Upon completing the 30 minute heating step, a molten mixture composed of 81 grams of chocolate liquor and 100 grams of hydrogenated soybean oil (m.p. 71.1° C. (160° F.)) was added to the coating formulation. The resulting mixture was heated for an additional 10 minutes after which nougat centers were enrobed with this coating mixture. The coating was softer than other coatings lacking an equivalent fat content, and it required 15 minutes to set sufficiently to be packaged. The flavor of this coating was rated as being particularly good. The Brookfield RVT viscosity of the molten coating formulation was measured using spindle C operated at 10 rpm as being 2500 cps.

EXAMPLE 9

Fat-free chocolate chips

A dispersion of 100 grams of MCC-guar-15 in 710 grams of water at room temperature was prepared using a high shear Silverson mixer. After 7 minutes of high speed shearing, the dispersion had the consistency of sour cream and a viscosity of 140,000 cps by the standard Brookfield method of Example 1. In a stainless steel beaker stirred by a Lightnin' mixer fitted with a large blade was placed 85 grams of glycerin, and the beaker was heated in a water bath at 60° C. (140° F.). To this beaker was added 162 grams of the dispersion, and the resulting mixture was stirred until it had a smooth consistency. A dry mixture composed of 684 grams of sucrose, 25 grams of crystalline fructose, and 4 grams of sodium chloride was rapidly added to the dispersion. This mixture was covered and heated for 30 minutes to solubilize the sugars. To the mixture was added 40 grams of defatted cocoa powder. The resulting mixture was heated for 10 minutes and then allowed to cool to 48.9° C. (120° F.) before being transferred to a pastry bag and being extruded in the form of a chocolate chip onto waxed paper. An initial set was obtained in 15 minutes, but at this point the chips were too soft to mix into dough without breakage. Therefore a curing period was employed to dry the chips further for a firmer texture. Curing time at room temperature for the chocolate chips produced was 24 hours. By allowing the mixture to cool and set up, and then remelting it, the chocolate chips produced in this manner solidified in about 7 hours.

EXAMPLE 10

A chocolate-flavored, fat-free, aqueous dispersion

The method of Example 1 was used to prepare a fat-free, aqueous dispersion, omitting only the initial dispersion step. Glycerin weighing 85 grams was thoroughly mixed with 142 grams of water and 20 grams of sucrose in a stainless steel beaker heated in a water bath at 60° C. (140° F.). To this mixture was added a dry mix of 704 grams of sucrose, 25 grams of crystalline fructose, and 4 grams of salt. This mixture was heated at 60° C. (140° F.) for 30 minutes to solubilize the sugars. At the conclusion of this heating period, 40 grams of defatted cocoa powder (DeZaan cocoa containing 10–12% fat) was added to the mixture. Heating was continued for an additional 5 minutes. Devils food cookies were dipped in this coating, and the set time was observed at various intervals. After only three minutes a comparable formulation (Example 2) containing 2.0% by weight of MCC-guar-15 had set to a soft coating, but the formulation without MCC-guar-15 was still soft and sticky. After 6 minutes the MCC-guar-15 containing coating had set well, but the other coating was described as being mushy. Fifteen minutes after applying the coatings the MCC-guar-15-containing coating had set to the point where it could be picked up, although it was not packaged for an additional 15 minutes. In contrast, the coating of this example was still soft after 15 minutes, and, when packaged after 30 minutes stuck to the packaging material. The unused portion of each formulation was poured into a pan and allowed to cool completely. The MCC-guar-15-containing formulation set up to a fudge, but the one lacking the MCC-guar-15 never did set up. Oatmeal cookies enrobed with the formulation without a MCC-guar and sealed in a polyethylene-polypropylene colaminate exhibited significant blooming by the third day of storage as well as exhibiting a less creamy mouthfeel and soft texture. Samples with the MCC-guar showed no bloom after 3 months and had a firm texture with a creamy, melt-away feel in the mouth.

EXAMPLE 11

In a mixture of 532.5 grams of deionized water and 177.5 grams of glycerin was dispersed 100 grams of aggregated MCC (85%) and guar gum (15%) (Novagel® BC-300 cellulose). The dispersion was obtained using a Silverson high shear mixer operated at 4500 rpm. After 50 minutes of mixing, the viscosity of the dispersion was 100,000 cps, and its temperature had risen to 48.3° C. (119° F.). Mixing was continued for an additional 5 minutes, after which the viscosity had increased to 132,000–136,000 cps. This dispersion is referred to in subsequent examples as Dispersion 11. It had a water activity ($A_w$) of 0.68. A portion (162 grams) of the dispersion was placed in a 1000 mL beaker which was stirred at 1300 rpm with a Lightnin'® mixer, and the beaker was immersed in a 65.6° C. (150° F.) water bath. To the dispersion was added 35.5 grams of water with 5 minutes of mixing. To this more dilute dispersion was added 70.0 grams of fructose, and this mixture was stirred for 5 minutes at 1300 rpm. Next, a dry combination of 664.0 grams of sucrose (10X) and 4.0 grams of salt was added to the beaker, followed by 25 minutes of mixing at 800 rpm. Additional glycerin weighing 49.5 grams was added and mixed for 5 minutes. The mixer speed was reduced to 500 rpm, and 15.0 grams of low fat cocoa powder (~10–12% fat) was added and mixed for 10 minutes. A moon pie was dipped in this mixture to observe the setting characteristics of the coating. The coated moon pie was cooled and dried with a fan operated at low speed. After 3 minutes the sheen of the coating began to disappear, an indication it was beginning to set. It was possible to touch the surface without leaving a fingerprint 4.5 minutes after the coating began to cool. After 10 minutes the coating had hardened sufficiently to be packaged.

EXAMPLE 12

A portion of Dispersion 11 (162.0 grams) was placed in a 1000 mL beaker, and the beaker was placed in a 65.6° C. (150° F.) water bath. To the dispersion which was stirred with a Lightnin'® mixer was added 334 grams of a dry mixture comprised of 332 grams of sucrose (10X) and 2 grams of salt. After mixing for a period of time, 49.5 grams of glycerin was added to the mixture, and mixing was continued until the mixing time after the two additions totaled 15 minutes. A second portion (334 grams) of the dry mixture comprised of 332 grams of sucrose and 2 grams of salt was added, followed by 15 minutes of mixing. The mixture at this point was thin and flowed readily. Next, 70.0 grams of fructose was added and mixing continued for 5 minutes. Low fat cocoa powder, ~10–12% fat, weighing 15.0 grams was added along with 8.5 grams of additional water. This mixture was stirred for 10 minutes before coating a moon pie at 67.2 (153° F.). The coating had solidified sufficiently after 5 minutes that the impression of a fingerprint was not left when the top was touched. After 6 minutes the coating had hardened sufficiently for the moon pie to be picked up without damage to the coating and could have been packaged. Two weeks after coating the moon pie there was no blooming evident with this coating. The water activity of this coating was 0.63.

EXAMPLE 13

A portion of Dispersion 11 (81.0 grams) was placed in a 1000 mL beaker which was placed in a 65.6° C. (150° F.) water bath. To the dispersion was added a mixture of 17.75 grams of deionized water and 24.75 grams of glycerin. The resulting mixture was mixed with a Lightnin'® mixer at 1300 rpm for 3 minutes, resulting in a smooth dispersion. To the dispersion was then added 334 grams of a dry mixture comprised of 332 grams of sucrose (10X) and 2 grams of salt. This mixture was mixed at 800 rpm for 30 minutes after which 7.5 grams of low fat (~10–12%) cocoa powder was added and mixed for 5 minutes. Next, 35.0 grams of fructose was added and mixed at 500 rpm for 10 minutes. The water activity of this coating was 0.62. A moon pie was dipped in this coating at 66.7° C. (152° F.). The coated moon pie was cooled with a fan running at low speed. After 4 minutes it was possible to touch the surface without leaving the impression of a fingerprint. The moon pie was able to be picked up after 6 minutes without harming the appearance of the coating and could have been packaged. Packaging was done 10–12 minutes after the moon pie was dipped. Two weeks after the coating was applied to the moon pie there was no visible bloom.

EXAMPLE 14

A portion of Dispersion 11 (81.0 grams) was placed in a 1000 mL beaker which was placed in a 65.6° C. (150° F.) water bath. To the dispersion was added a mixture of 17.75 grams of deionized water and 24.75 grams of glycerin. The resulting mixture was mixed with a Lightnin'® mixer at 1300 rpm for 3 minutes, resulting in a smooth, creamy dispersion. To the dispersion was then added 35.0 grams of fructose and mixing was continued at 1300 rpm for 5 minutes. During this mixing there appeared to be a very slight amount of flocculation. Next, 334 grams of a dry mixture comprised of 332 grams of sucrose (10X) and 2 grams of salt was added. This mixture was mixed at 800 rpm for 30 minutes after which 7.5 grams of low fat (~10–12%) cocoa powder was added and mixed at 500 rpm for 10 minutes. The coating mixture was smooth and had a low viscosity. A moon pie was dipped in this coating at 63.9° C. (147° F.), and the coated moon pie was cooled and dried with a fan running at low speed. After 4 minutes it was possible to touch the surface leaving no impression of a fingerprint. The moon pie coating was hard and the pie able to be picked up after 5 minutes without harming the appearance of the coating. The coating appeared to be slightly grainy compared to the coatings of Examples 11–13, but still acceptable. The water activity of this coating was 0.65 at 25° C., and the water activity of the coated moon pie was 0.66. The water activity of the uncoated moon pie was 0.63. Two weeks after the coating was applied to the moon pie there was no visible bloom.

EXAMPLE 15

A portion of Dispersion 11 (81.0 grams) was placed in a 1000 mL beaker which was placed in a 65.6° C. (150° F.) water bath. To the dispersion was added a mixture of 17.75 grams of deionized water and 24.75 grams of glycerin. The resulting mixture was stirred with a Lightnin'® mixer at 1300 rpm for 3 minutes. To this dispersion was added 110.1 grams of mannitol, and the resulting mixture was stirred at 1300 rpm for 5 minutes. Next, 258.9 grams of a dry mixture comprised of 256.9 grams of sucrose (10X) and 2 grams of salt was added. This mixture was stirred at 800 rpm for 30 minutes after which 7.5 grams of low fat cocoa powder was added and mixed at 500 rpm for 10 minutes. This coating was more viscous than the coatings of Examples 13 and 14, but it still flowed. Moon pies were coated with this mixture. The coated moon pies were cooled and dried with a fan running at low speed. After 3 minutes the coated pies were able to be picked up and handled. Although the coating was still warm, it had hardened and had set on the sides and bottom of the moon pie. The water activity of this coating was 0.685 at 27° C. After 4 days of storage the coating bloomed, because this formulation did not contain fructose or isomalt.

EXAMPLE 16

A dispersion was prepared as for Dispersion 11 except that the Silverson high shear mixer was operated at high speed (~10,000 rpm) for 9 minutes. The resulting dispersion had a viscosity of 164,000 cps at 54.4° C. (130° F.). This dispersion is referred to as Dispersion 16 in subsequent examples. A portion of this dispersion (121.5 grams) was placed in a 1000 mL beaker which was placed in a 60° C. (140° F.) water bath. The beaker was stirred with a Lightnin'® mixer operated at 1300 rpm. Additional water (30.1 grams) was added to the dispersion which was mixed for 2 minutes, resulting in a smooth, creamy dispersion. Next, a dry blend of 403 grams of sucrose (10X), 250 grams of mannitol, 2 grams of salt, and 80 grams of fructose was added to the dispersion. This mixture was stirred initially at 1300 rpm, but the mixer stalled. Reducing the speed of the mixer to 500 rpm for 20 minutes permitted increasing the speed of the mixer to 1300 rpm for the remainder of the 30 minute mixing time. Glycerin (83.4 grams) was then added to the mixture with stirring continuing at 1300 rpm for 10 minutes. Low fat cocoa powder (30 grams) was added to the mixture and stirring was continued at 800 rpm for 10 minutes. This coating was very viscous. Oatmeal cookies (water activity of 0.55) were dipped in the coating, covering one-half the cookie, and placed on waxed paper while being cooled and dried without a fan. After 8 minutes of cooling, it was possible to touch the top surface of the coating without leaving the impression of a fingerprint. At this time, moving the cookie on the waxed paper caused a slight smearing. After 15 minutes of cooling, the cookies could have been packaged. The water activity of the coating was 0.58–0.60 at 28° C.

EXAMPLE 17

A portion (60.75 grams) of Dispersion 16 was placed in a beaker which was placed in a 60° C. (140° F.) water bath. To this dispersion was added 15.05 grams of deionized water. The beaker was stirred with a Lightnin'® mixer operated at 1300 rpm for 2 minutes, resulting in a creamy, smooth dispersion. To this dispersion was added a dry mix of 201.5 grams of sucrose (10X), 125 grams of lactose, 1 gram of salt, and 40 grams of fructose. This mixture was stirred at 800 rpm for 30 minutes. This mixture was less viscous than the corresponding mixture in Example 16. Glycerin (41.7 grams) was added to the mixture which was stirred at 800 rpm for 10 minutes. The resulting mixture had a very low viscosity. Next, 15 grams of low fat cocoa powder was added and mixed at 500 rpm for 10 minutes. After addition of the dry blend to the dispersion, the viscosity was very similar to the corresponding mixture in Example 15. It also had a yellowish cast to it. The complete coating mixture was similar in viscosity to that of Example 15 and had a slightly sandy mouthfeel. Oatmeal cookies were dipped in this coating as in Example 16. After 30 minutes of cooling the top surface was hard enough to be touched without leaving the impression of a fingerprint, but the bottom was still sticky. After 1 hour the cookies were able to be packaged. After storage for 74 days, no bloom was evident with this coating, and it had a bit of sheen. The water activity of the coating was 0.58.

EXAMPLE 18

A portion (60.75 grams) of Dispersion 16 was placed in a beaker. To this dispersion was added 15.05 grams of deionized water and the beaker was placed in a hot water bath. The beaker was stirred with a Lightnin'® mixer operated at 1300 rpm for 2 minutes, resulting in a smooth dispersion. To this dispersion was added a dry mix of 146.5 grams of sucrose (10X), 180 grams of isomalt, 1 gram of salt, and 40 grams of fructose. This mixture was stirred at 800 rpm for 30 minutes. Although this mixture was viscous, it could be stirred at 800 rpm. Glycerin (41.7 grams) was added to the mixture which was stirred at 800 rpm for 10 minutes. Next, 15 grams of a low fat cocoa powder was added and mixed at 500 rpm for 10 minutes. The resulting coating mixture was flowable and had low viscosity. Oatmeal cookies were dipped in the coating as in Example 16 and allowed to cool at ambient temperature without using a fan. After 1 hour only a slight impression of a fingerprint was left when the cookies were touched. Fifteen minutes later the cookies were removed from the waxed paper cleanly and had only a slight stickiness. The coating was not very glossy, appeared more like a fat-containing coating, but not very glossy. More than 160 days after the cookies were coated, there was no evidence of bloom.

EXAMPLE 19

The procedure of Example 17 was used except that the dry mix was comprised of 186.5 grams of sucrose (10X), 180 grams of isomalt PF, and 1 gram of salt, and it was added in two separate additions with the glycerin being added in between. The glycerin (41.7 grams) was added immediately after the first half of the dry mix was added and mixed at 800 rpm for 15 minutes. After the second portion of the dry mix was added, the mixture was stirred for 25 minutes at 800 rpm before adding the cocoa powder. Oatmeal cookies were dipped in the coating as in Example 16 and allowed to cool at ambient temperature without using a fan. After 6.5 minutes no fingerprint was left when the cookies were touched. After 10 minutes the coating on the cookies looked like a fat-containing compound coating. Five minutes later the cookies were packaged, and the coating was judged to be good. A few months after the cookies were coated, there was no evidence of bloom.

EXAMPLE 20

The procedure of Example 19 was utilized except that the dry blend was comprised of 166.5 grams of sucrose (10X), 150 grams of mannitol, 50 grams of sorbitol, and 1 gram of salt. The glycerin (41.7 grams) was added immediately after the first half of the dry mix was added and stirring continued at 800 rpm for 15 minutes. The second portion of the dry mix was then added, and was stirred for 15 minutes at 800 rpm before adding the low fat cocoa powder which was mixed in at 500 rpm for 10 minutes. The coating mixture had a higher viscosity than a similar coating mixture containing only sucrose, but was able to coat oatmeal cookies as in Example 16. After cooling for 10 minutes, the coating was hard enough to be touched without leaving the impression of a fingerprint, although the bottom of the cookie was soft and sticky, smearing the waxed paper somewhat. These cookies were able to be packaged after cooling and drying for 15 minutes. The surface of the hardened coating was not shiny, and the texture of the coating was less gritty than any previous mannitol-containing coating. There was no bloom with this coating after 24 hours.

EXAMPLE 21

The procedure of Example 19 was utilized except that the dry blend was comprised of 166.5 grams of sucrose (10X), 125 grams of mannitol, 75 grams of polydextrose, and 1 gram of salt. The glycerin (41.7 grams) was added immediately after the first half of the dry mix was added and stirring continued at 800 rpm for 15 minutes. After the second portion of the dry mix was added, the mixture was stirred for 15 minutes at 800 rpm before adding the cocoa powder, which was then mixed at 500 rpm for 10 minutes. The coating mixture had a high viscosity and was able to coat oatmeal cookies as in Example 16. After cooling for 10 minutes, the coating had started to set; however, the bottom of the cookie was very sticky, adhering to the waxed paper. The coating was still shiny after 45 minutes of cooling, but the surface was hard enough to touch. The bottom remained soft and sticky. Evaluation after 24 hours showed that the coating had set hard, was smoother than Example 20, did not have any snap, and there was no evidence of bloom.

What is claimed is:

1. An aqueous dispersion comprising from about 50–90 weight percent sugar, from about 0.2–6 weight percent aggregated microcrystalline cellulose and a gum selected from galactomannan gum, glucomannan gum and mixtures thereof, from about 2–20 weight percent water from about 0–20 weight percent of fat, from about 0–25 weight percent of glycerin, and from about 0–30 percent of a flavoring material, based on the weight of the dispersion.

2. The dispersion of claim 1 wherein the aggregated microcrystalline cellulose and a gum comprise from about 60–99 weight percent microcrystalline cellulose and about 40–1 weight percent of the gum, based on the weight of the aggregate.

3. The aqueous dispersion of claim 1 which is a solid at room temperature.

4. The aqueous dispersion of claim 1 which exhibits the ability to set and which has sugar bloom stability.

5. The dispersion of claim 2 wherein the aggregated microcrystalline cellulose and a gum comprise from about 70–95 weight percent microcrystalline cellulose and about 30–5 weight percent of the gum, based on the weight of the aggregate and wherein the gum is selected from guar gum, locust bean gum, konjac and mixtures thereof.

6. The aqueous dispersion of claim 5 wherein:

the sugar is sucrose, glucose, fructose, dextrose, lactose, oligofructose, maltodextrins, starches, inulin, polydextrose, invert syrups, corn syrups having a DE of about 20–65, crystallizable sugar alcohols, or mixtures thereof, the aggregate of microcrystalline cellulose and gum comprises from about 70–85 weight percent of microcrystalline cellulose and from about 15–30 weight percent guar gum, locust bean gum or mixtures thereof, the fat is chocolate liquor, cocoa powder, cocoa butter, milk fat, palm oil, soy bean oil, canola oil cottonseed oil, coconut oil, palm oil, corn oil, olive oil, peanut oil, hydrogenated soy bean oil, hydrogenated palm oil, hydrogenated canola oil, hydrogenated corn oil, hydrogenated cottonseed oil or mixtures thereof, and the flavoring material is yogurt powder, peanut powder, fruit powder, milk powder, carob powder, flavor extracts, or mixtures thereof.

7. The aqueous dispersion of claim 6 wherein the gum is guar gum, the sugar is selected from sucrose, fructose, dextrose, lactose, corn syrups having a DE of about 20–65, mannitol and isomalt, and the fat is chocolate liquor, cocoa powder, low fat cocoa powder or mixtures thereof.

8. The aqueous dispersion of claim 5 wherein the gum is guar gum and sucrose comprises from 50–100 weight percent of the sugar.

9. The aqueous dispersion of claim 7 wherein the sugar portion of the dispersion comprises a mixture wherein at least one of the sugars is sucrose and at least one of the other sugars is fructose, lactose, mannitol, isomalt or mixtures thereof.

10. The aqueous dispersion of claim 9 wherein at least one of the sugars is a low solubility sugar and comprises at least about 8 weight percent of isomalt, mannitol, lactose or mixtures thereof.

11. The aqueous dispersion of claim 10 wherein the mixture of sugar further comprises about 30 to about 35 weight percent sucrose.

12. The aqueous dispersion of claim 8 or 10 wherein the sugar is sucrose, fructose, dextrose, mannitol, isomalt, lactose or mixtures thereof, and the fat is chocolate liquor, cocoa powder, low fat cocoa powder or mixtures thereof.

13. The aqueous dispersion of claim 1, 5 or 9 wherein the initial viscosity of the aggregate of microcrystalline cellulose and gum sheared with water or other aqueous component of the dispersion is about 120,000–180,000 centipoises.

14. The aqueous dispersion of claim 12 comprising from about 60–80 weight percent of sugar, from about 0.5–3 weight percent of the aggregate of microcrystalline cellulose and gum, from about 6–16 weight percent of water, from about 0–6 weight percent of fat, from about 9–13 weight percent of glycerin and from about 0–10 weight percent of a flavoring material, based on the weight of the dispersion.

15. The aqueous dispersion of claim 12 wherein the gum is guar gum and it comprises about 15 weight percent by weight of the aggregate.

16. An aqueous dispersion comprising about 70 weight percent sucrose, about 2.5 weight percent fructose, about 8.5 weight percent glycerin, about 14 weight percent water, about 2 weight percent of an aggregate of about 85 weight percent microcrystalline cellulose and about 15 weight percent of guar gum, and about 3 weight percent of chocolate liquor.

17. An aqueous dispersion comprising about 30–35 weight percent sucrose, about 2–8 weight percent fructose, about 17–35 weight percent isomalt, about 7–11 weight percent glycerin, about 7–12 weight percent water, about 1–2 weight percent of an aggregate of about 85 weight percent microcrystalline cellulose and about 15 weight percent guar gum, and about 2–5 weight percent of flavoring material.

18. The aqueous dispersion of claim 3, 9 or 10 which is an inclusion or a food coating.

19. The aqueous dispersion of claim 3, 5, 9 or 10 wherein it is used as an inclusion or a food coating.

20. The aqueous dispersion of claim 1, 5, 7 or 10 which is produced at a temperature of about 120° to about 200° F. and upon cooling sets in less than about one hour and is a firm or soft solid at room temperature.

21. The aqueous dispersion of claim 5 which mimics the rheology of a chocolate compound food coating.

22. The aqueous dispersion of claim 5 or 9 wherein sucrose comprises from about 30–75 weight percent of the total weight of the sugar and wherein the water comprises from about 6–14 weight percent of the weight of the dispersion and the dispersion is applied to a low moisture content food.

23. The aqueous dispersion of claim 5 or 9 wherein sucrose comprises from about 30–80 weight percent of the total weight of the sugar and wherein the water comprises from about 12–16 weight percent of the weight of the dispersion and the dispersion is applied to an intermediate moisture content food.

24. The aqueous dispersion of claim 5 or 9 wherein sucrose comprises from about 90–100 weight percent of the total weight of the sugar and wherein the water comprises from about 14–20 weight percent of the weight of the dispersion and the dispersion is applied to a high moisture content food.

25. The aqueous dispersion of claim 5 which is produced at a temperature of about 130°–150° F. and upon cooling sets in about 10–30 minutes to a firm or soft solid at room temperature.

26. A method for setting a high sugar content dispersion to a firm or soft solid comprising adding an aggregate of microcrystalline cellulose and a gum selected from the group consisting of galactomannan gum, glucomannan gum and mixtures thereof, to the high sugar content dispersion and effecting a difference in temperature, to a lower temperature, sufficient to cause the setting of the dispersion to occur.

27. The method of claim 26 wherein the dispersion comprises from about 50–90 weight percent sugar selected from sucrose, glucose, fructose, dextrose, lactose, oligofructose, maltodextrins, starches, inulin, polydextrose, invert sugars, corn syrups having a DE of about 20–65, crystallizable sugar alcohols, selected from isomalt, sorbitol, lactitol, mannitol, maltitol, hydrogenated starch hydrolysate, or mixtures thereof, from about 0.2–6 weight percent of the aggregated microcrystalline cellulose and gum wherein the aggregate comprises from about 15–30 weight percent galactomannan gum, and from about 2–20 weight percent water, based on the weight of the dispersion.

28. The method of claim 27 wherein the aqueous dispersion is produced at a temperature of about 120° to about 200° F. and upon cooling sets in less than about one hour to a firm or soft solid at room temperature.

29. The method of claim 26 wherein the initial viscosity of the aggregate of microcrystalline cellulose and gum which is sheared with water or other aqueous component of the dispersion is about 120,000–180,000 centipoises.

30. The method of claim 27 wherein the aqueous dispersion comprises from about 60–80 weight percent of sugar,
from about 0.5–3 weight percent of the aggregate of microcrystalline cellulose and gum, wherein the aggregate comprises about 15 weight percent guar gum,
from about 6–16 weight percent of water,
from 0 to about 6 weight percent of fat,
from about 9–13 weight percent of glycerin and
from 0 to about 10 weight percent of a flavoring material, based on the weight of the dispersion.

31. The method of claim 30 wherein the sugar is sucrose, fructose, mannitol, isomalt, dextrose, lactose, corn syrups having a DE of about 20–65, or mixtures thereof, the fat is chocolate liquor, cocoa powder, cocoa butter, milk fat, palm oil, soy bean oil, canola oil cottonseed oil, coconut oil, palm oil, corn oil, olive oil, peanut oil, hydrogenated soy bean oil, hydrogenated palm oil, hydrogenated canola oil, hydrogenated corn oil, hydrogenated cottonseed oil or mixtures thereof, and the flavoring material is yogurt powder, peanut powder, fruit powder, milk powder, carob powder, flavor extracts, or mixtures thereof.

32. The method of claim 27 wherein the gum is guar gum and it comprises about 15 weight percent by weight of the aggregate and wherein the sugar portion of the dispersion comprises from about 50 to 100 weight percent sucrose.

33. The method of claim 27 wherein the aggregate comprises about 15 weight percent guar gum, the sugar portion of the dispersion comprises a mixture wherein at least one of the sugars is a low solubility sugar.

34. The method of claim 32 or 33 wherein the dispersion is produced at a temperature of about 140° F. to about 150° F. and upon cooling sets in about 10–30 minutes to a firm or soft solid at room temperature.

35. The method of claim 34 wherein the setting of the dispersion is effected by a drop in temperature of about 60° F.

* * * * *